(12) United States Patent
Satoh

(10) Patent No.: US 6,415,393 B2
(45) Date of Patent: *Jul. 2, 2002

(54) INSPECTION OF AN INTEGRATED CIRCUIT DEVICE WHILE BEING MOUNTED ON A CIRCUIT BOARD

(75) Inventor: Shuji Satoh, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,652

(22) Filed: Jul. 15, 1998

(30) Foreign Application Priority Data

Jul. 16, 1997 (JP) .............................. 9-191209

(51) Int. Cl.[7] ................................ G06F 11/00
(52) U.S. Cl. .............................. 714/30; 714/28; 717/4; 712/227
(58) Field of Search ................................ 714/699, 724, 714/726, 727, 729, 733, 25, 28, 30, 45, 34, 35, 734, 742; 717/4, 128; 712/227

(56) References Cited

U.S. PATENT DOCUMENTS 5,479,652 A * 12/1995 Dreyer et al. ................. 714/30
5,537,536 A * 7/1996 Groves ......................... 714/28
5,884,023 A * 3/1999 Swoboda et al. .............. 714/30
5,983,017 A * 11/1999 Kemp et al. ..................... 717/4
6,032,268 A * 2/2000 Swoboda et al. .............. 714/30
6,070,252 A * 5/2000 Xu et al. ....................... 714/30

FOREIGN PATENT DOCUMENTS

| JP | 59-95654 | 6/1984 |
| JP | 62-98437 | 5/1987 |
| JP | 4-112341 | 4/1992 |
| JP | 4-317140 | 11/1992 |
| JP | 7-152598 | 6/1995 |
| JP | 8-15387 | 1/1996 |
| JP | 9-120393 | 5/1997 |

* cited by examiner

*Primary Examiner*—Zarni Maung
*Assistant Examiner*—Wen-Tai Lin
(74) *Attorney, Agent, or Firm*—McGinn & Gibb, PLLC

(57) ABSTRACT

An integrated circuit device can be inspected in various ways while it is being installed on a circuit board. A bus control unit connects an external memory to a central processing unit in a normal mode. In an inspection mode, the bus control unit connects an inspection control circuit, which has a plurality of registers for temporarily storing instruction codes and data to be processed from an external circuit inspection device, to the central processing unit at a suitable time. When the instruction codes and data from the external circuit inspection are stored in the registers of the inspection control circuit, the central processing unit can be inspected while it is effecting a desired data processing operation.

34 Claims, 4 Drawing Sheets

INSPECTION OF AN INTEGRATED CIRCUIT DEVICE WHILE BEING MOUNTED ON A CIRCUIT BOARD

BACKGROUND OF THE INVENTION

1. Field of the Invention

The present invention relates to an integrated circuit device comprising at least a central processing unit, a bus control circuit, and an inspection control circuit, and a method and an apparatus for inspecting such an integrated circuit device.

2. Description of the Related Art

Heretofore, a system called an ICE (In-Circuit Emulator) has been used to inspect internal operations of integrated circuit devices constructed as single chips. The ICE system reads all input and output signals of an integrated circuit device to emulate internal operations thereof. Therefore, the ICE system is capable of debugging an integrated circuit device while it is in a development stage.

The ICE system is required to connect its connection terminals individually to all the input and output terminals of an integrated circuit device to be inspected, therefore it is difficult to use the ICE system to inspect an integrated circuit device when it is mounted on a circuit board. To eliminate such a drawback, there has been proposed an integrated circuit device incorporating a built-in inspection control circuit which is capable of debugging the integrated circuit device while it is mounted on a circuit board.

One conventional integrated circuit device with such a built-in inspection control circuit will be described below with reference to FIG. 1 of the accompanying drawings. FIG. 1 shows in block form an internal structure of a conventional integrated circuit device. As shown in FIG. 1, the integrated circuit device, generally designated by 100, has a CPU (Central Processing Unit) core 1 connected by a dedicated internal bus 2 to a BCU (Bus Control Unit) 3 which is connected to a main bus 4.

The integrated circuit device 100 also has various peripheral circuits 5 connected to the main bus 4. A number of lead terminals 7 are connected through the main bus 4 to the CPU core 1, the BCU 3, and the peripheral circuits 5. The integrated circuit device 100 further includes a DCU (Debug Control Unit) 6 as an inspection control circuit independent of the main bus 4. The DCU 6 has a plurality of boundary scan cells 8 connected respectively to a plurality of lead terminals 10 serving as an inspection information I/F (Interface) 9 of JTAG (Joint Test Action Group).

Boundary scan cells 8 are also connected individually to the lead terminals 7. The boundary scan cells 8 connected to the lead terminals 7 are connected in a loop pattern from one of the boundary scan cells 8 of the DCU 6 to the other boundary scan cell 8 of the DCU 6.

The integrated circuit device 100 of the above structure, even when it is mounted on a circuit board (not shown) desired by the user, can be debugged by a boundary scan test. For debugging the integrated circuit device 100, a debugging connector is mounted on the circuit board, and the inspection information I/F 9 of the integrated circuit device 100 mounted on the circuit board is connected to the debugging connector.

The lead terminals 7 other than the inspection information I/F 9 of the integrated circuit device 100 are connected respectively to necessary leads on the circuit board. When an ordinary mode is established as an operation mode of the integrated circuit device 100, since the boundary scan cells 8 connected individually to the lead terminals 7 pass communication data without changing it, the CPU core 1, etc. of the integrated circuit device 100 can communicate with the leads on the circuit board through the lead terminals 7.

When the connector of a circuit inspection device (not shown) is connected to the connector on the circuit board and the operation mode of the integrated circuit device 100 is switched to a test mode, bus cycles of the CPU core 1 are stopped at a certain time, and the boundary scan cells 8 form a shift register.

Now, communication data including addresses and commands which the CPU core 1, etc. communicate through the lead terminals 7 can be replaced and acquired by the DCU 6 through the shift register made up of the boundary scan cells 8. Because the boundary scan cells 8 are connected to the circuit inspection device through the inspection information I/F 9, the circuit inspection device can inspect internal operations of the integrated circuit device 100.

Another conventional integrated circuit device with such a built-in inspection control circuit will be described below with reference to FIG. 2 of the accompanying drawings. FIG. 2 shows in block form an internal structure of the integrated circuit device. Those parts shown in FIG. 2 which are identical to those of the conventional integrated circuit device shown in FIG. 1 are identically referred to, and will not be described in detail below.

The integrated circuit device, generally designated by 200, has a CPU core 21 connected by a dedicated internal bus 22 to a BCU 23 which is connected to a main bus 24. To the main bus 24, there are connected various peripheral circuits 25 and a DCU 26 as an inspection control circuit. A number of lead terminals 27 are connected through the main bus 24 to the CPU core 21, the BCU 23, and the peripheral circuits 25.

Unlike the integrated circuit device 100, the DCU 26 has a DMA (Direct Memory Access) controller 28 that is directly connected to the main bus 24. To the DCU 26, there are connected a plurality of lead terminals 30 as an inspection information I/F 29 of JTAG, which are connected to the DMA controller 28.

The DCU 26 has no boundary scan cells, and the lead terminals 27 have no boundary scan cells either. Various I/O (Input/Output) ports 31 and a memory 32 as an information storage medium on a circuit board (not shown) are connected to the lead terminals 27 which are connected directly to the BCU 23. The memory 32 stores, for example, instruction codes and processed data which are to be read by the integrated circuit device 200.

A debugging connector is mounted on a circuit board prepared by the user, and the inspection information I/F 29 of the integrated circuit device 200 mounted on the circuit board is connected to the debugging connector. In an ordinary mode, data communications with the peripheral circuits 25 through the main bus 24 are controlled by the CPU core 21 through the BCU 23.

When the connector of a circuit inspection device (not shown) is connected to the connector on the circuit board and a test mode is started for the integrated circuit device 200, the DCU 26 can directly access the peripheral circuits 25 from the main bus 24 without being routed through the BCU 23 due to a DMA function of the DMA controller 28. Therefore, the circuit inspection device can inspect internal operations of the integrated circuit device 200.

Consequently, the integrated circuit devices 100, 200 can be inspected for their internal operations while being mounted on the circuit board that the user has prepared.

However, the integrated circuit device 100 with the boundary scan cells cannot easily be controlled because bus cycles of the CPU core 1 need to be stopped at an appropriate time for inspecting internal operations of the integrated circuit device 100, and communication data is replaced and acquired through the shift register made up of the boundary scan cells 8.

Because the boundary scan cells 8 which make up the shift register need to be connected individually to the lead terminals 7, the integrated circuit device 100 is relatively complex in structure and large in size. The boundary scan cells 8 connected individually to the lead terminals 7 can basically be used only for the boundary cell test, and hence are not highly versatile in nature.

With the integrated circuit device 200 based on the DMA principles, the DCU 26 directly accesses the peripheral circuits 25 and the BCU 23 without being routed through the CPU core 21 due to a DMA function of the DMA controller 28. It is difficult for the DCU 26 to access an internal register of the CPU core 21. If the DCU 26 is to be allowed to access the internal register of the CPU core 21, then it is necessary to modify the CPU core 21 extensively. Such a modification process is tedious and time-consuming, and the modified CPU core 21 would have lowered compatibility with the peripheral circuits and other circuits.

SUMMARY OF THE INVENTION

It is an object of the present invention to provide an integrated circuit device whose internal operations can easily be inspected while being mounted on a circuit board, and a method of and an apparatus for inspecting such an integrated circuit device.

According to the present invention, an integrated circuit device has an inspection information interface for detachable connection to an external circuit inspection device, an inspection control circuit connected to the inspection information interface and having a plurality of registers for temporarily storing instruction codes and data to be processed which are supplied from the external circuit inspection device, and a bus control unit for selectively connecting the external bus and the inspection control circuit to the central processing unit.

The bus control unit has an operation mode switchable between a normal mode and an inspection mode. The bus control unit connects the external bus continuously to the central processing unit in the normal mode, and switches a destination to be connected to the central processing unit from the external bus to the inspection control circuit in the inspection mode when the address of an access destination issued by the central processing unit agrees with the predetermined address of one of the registers of the inspection control circuit.

In the normal mode, the bus control unit connects the external bus continuously to the central processing unit. The central processing unit reads the instruction codes and data to be processed from an external information storage medium, and executes various data processing tasks. When the external circuit inspection device is connected to the inspection information interface to switch the operation mode of the bus control unit from the normal mode to the inspection mode, the bus control circuit switches a destination to be connected to the central processing unit from the external bus to the inspection control circuit at a given time.

The central processing unit then reads the instruction codes and data to be processed from the inspection control circuit at a predetermined time. Therefore, if desired instruction codes and data to be processed are stored into the registers of the inspection control circuit by the circuit inspection device, the central processing unit can perform a desired data processing operation in the inspection mode.

Consequently, it is possible to inspect the integrated circuit device while the integrated circuit device is being installed on a circuit board. The integrated circuit device can effect various data processing tasks, and the process of inspecting the integrated circuit device is not limited to the boundary scan test. Thus, an internal register of the central processing unit can also be inspected.

The registers of the inspection control circuit may include an instruction code register for temporarily storing an instruction code for instructing the central processing unit to effect a predetermined data processing operation, a data register for temporarily storing data to be processed by the central processing unit based on the instruction code stored by the instruction code register, and a return instruction code register for temporarily storing an instruction code to return an access destination for the central processing unit to the instruction code register.

The inspection control circuit has at least those three registers for temporarily storing an instruction code for instructing the central processing unit to effect a predetermined data processing operation, data to be processed by the central processing unit, and an instruction code to return an access destination for the central processing unit to the instruction code register. When the central processing unit reads the instruction code to return the access destination after having effected the data processing operation based on the instruction code and the data to be processed, since the access destination is returned to the instruction code register, the central processing unit effects a next data processing operation by updating the instruction codes and the data to be processed when the data processing operation has been carried out. Consequently, a number of data processing operations for inspection can be carried out by the central processing unit with a minimum required number of registers.

Alternatively, the registers of the inspection control circuit may include an instruction code register for temporarily storing an instruction code for instructing the central processing unit to effect a predetermined data processing operation, a data register for temporarily storing data to be processed by the central processing unit based on the instruction code stored by the instruction code register, and a return instruction code register for permanently storing an instruction code to return an access destination for the central processing unit to the instruction code register.

The inspection control circuit has at least those three registers for temporarily storing an instruction code for instructing the central processing unit to effect a predetermined data processing operation, and data to be processed by the central processing unit, and permanently storing an instruction code to return an access destination for the central processing unit to the instruction code register. When the central processing unit reads the instruction code to return the access destination after having effected the data processing operation based on the instruction code and the data to be processed, since the access destination is returned to the instruction code register, the central processing unit effects a next data processing operation by updating the instruction codes and the data to be processed when the data processing operation has been carried out.

Consequently, a number of data processing operations for inspection can be carried out by the central processing unit with a minimum required number of registers. In addition, the circuit inspection device does not need to store an instruction code to return the access destination in a register.

According to the present invention, a method of inspecting an integrated circuit device comprises the steps of storing an instruction code for a predetermined data processing operation in an instruction code register, storing data to be processed by a central processing unit in a data register, storing an instruction code to return an access destination in a return instruction code register, updating the instruction code stored in the instruction code register and the data stored in the data register when the central processing unit effects the predetermined data processing operation based on the instruction code stored in the instruction code register and the data stored in the data register, and returning the access destination of the central processing unit to the instruction code register based on the instruction code stored in the return instruction code register.

The instruction code for the predetermined data processing operation is stored in the instruction code register, the data to be processed by the central processing unit is stored in the data register, and the instruction code to return the access destination is stored in the return instruction code register. The access destination of the central processing unit is returned to the instruction code register after the central processing unit has effected the data processing operation based on the instruction codes and the data to be processed. Therefore, the central processing unit effects a next data processing operation by updating the instruction codes and the data to be processed when the data processing operation has been carried out.

According to the present invention, furthermore, a method of inspecting an integrated circuit device comprises the steps of storing an instruction code for a predetermined data processing operation in an instruction code register, storing data to be processed by a central processing unit in a data register, updating the instruction code stored in the instruction code register and the data stored in the data register when the central processing unit effects the predetermined data processing operation based on the instruction code stored in the instruction code register and the data stored in the data register, and returning the access destination of the central processing unit to the instruction code register based on the instruction code stored in the return instruction code register.

The instruction code for the predetermined data processing operation is stored in the instruction code register, and the data to be processed by the central processing unit is stored in the data register. The access destination of the central processing unit is returned to the instruction code register after the central processing unit has effected the data processing operation based on the instruction codes and the data to be processed. Therefore, the central processing unit effects a next data processing operation by updating the instruction codes and the data to be processed when the data processing operation has been carried out.

According to the present invention, an apparatus for an inspecting an integrated circuit device comprises a connector detachably connected to an inspection information interface, instruction code storing means for storing an instruction code for instructing a central processing unit to effect a predetermined data processing operation from the connector through the inspection information interface into an instruction code register, data storing means for storing data to be processed from the connector through the inspection information interface into a data register, and return instruction code storing means for storing an instruction code to return an access destination from the connector through the inspection information interface into a return instruction code register.

The connector is connected to the inspection information interface. The instruction code for the predetermined data processing operation is stored in the instruction code register, the data to be processed by the central processing unit is stored in the data register, and the instruction code to return the access destination is stored in the return instruction code register. The access destination of the central processing unit is returned to the instruction code register after the central processing unit has effected the data processing operation based on the instruction codes and the data to be processed. Therefore, the central processing unit effects a next data processing operation by updating the instruction codes and the data to be processed when the data processing operation has been carried out.

According to the present invention, furthermore, an apparatus for an inspecting an integrated circuit device comprises a connector detachably connected to the inspection information interface, instruction code storing means for storing the instruction code for instructing the central processing unit to effect the predetermined data processing operation from the connector through the inspection information interface into the instruction code register, and data storing means for storing the data to be processed from the connector through the inspection information interface into the data register. The connector is connected to the inspection information interface. The instruction code for the predetermined data processing operation is stored in the instruction code register, and the data to be processed by the central processing unit is stored in the data register. The access destination of the central processing unit is returned to the instruction code register after the central processing unit has effected the data processing operation based on the instruction codes and the data to be processed. Therefore, the central processing unit effects a next data processing operation by updating the instruction codes and the data to be processed when the data processing operation has been carried out.

The above and other objects, features and advantages of the present invention will become apparent from the following description with reference to the accompanying drawings which illustrate an example of the present invention.

DESCRIPTION OF THE PREFERRED EMBODIMENT

Figure 3:
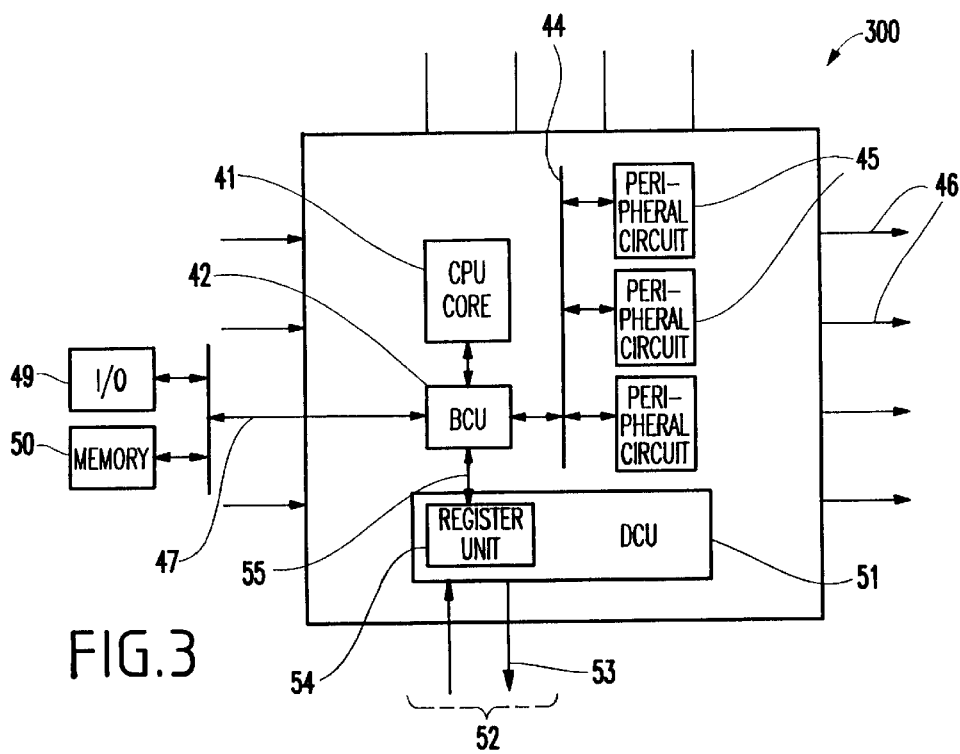
FIG. 3 is a block diagram showing an internal structure of an integrated circuit device according to the present invention.

As shown in FIG. 3, an integrated circuit device 300 according to the present invention has a CPU core 41 connected by a dedicated internal bus 42 to a BCU 43 which is connected to a main bus 44. To the main bus 44, there are connected various peripheral circuits 45. A number of lead terminals 46 are connected through the main bus 44 to the CPU core 41, the BCU 43, and the peripheral circuits 45.

Figure 1:
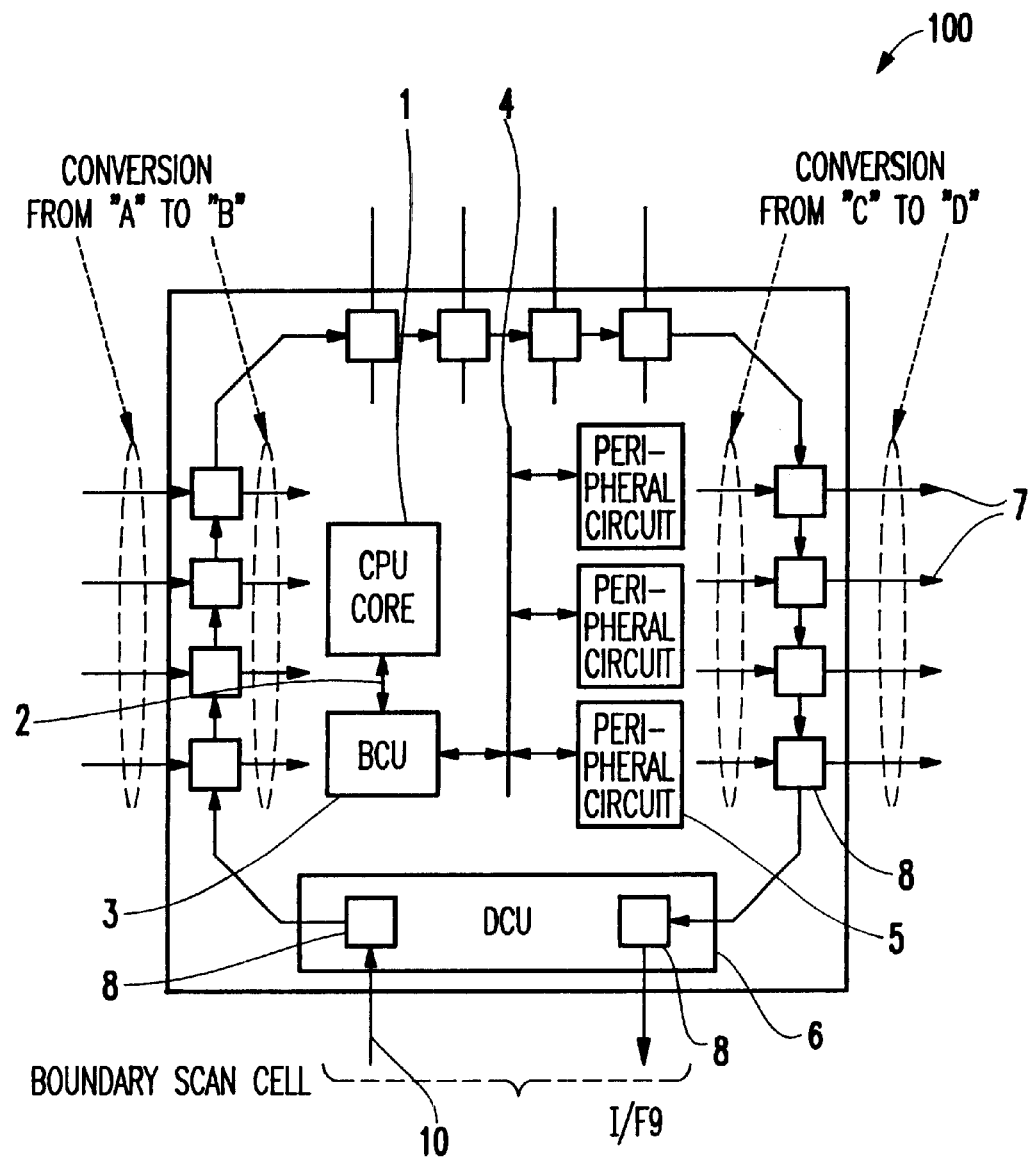
FIG. 1 is a block diagram showing an internal structure of a conventional integrated circuit device.
Figure 2:
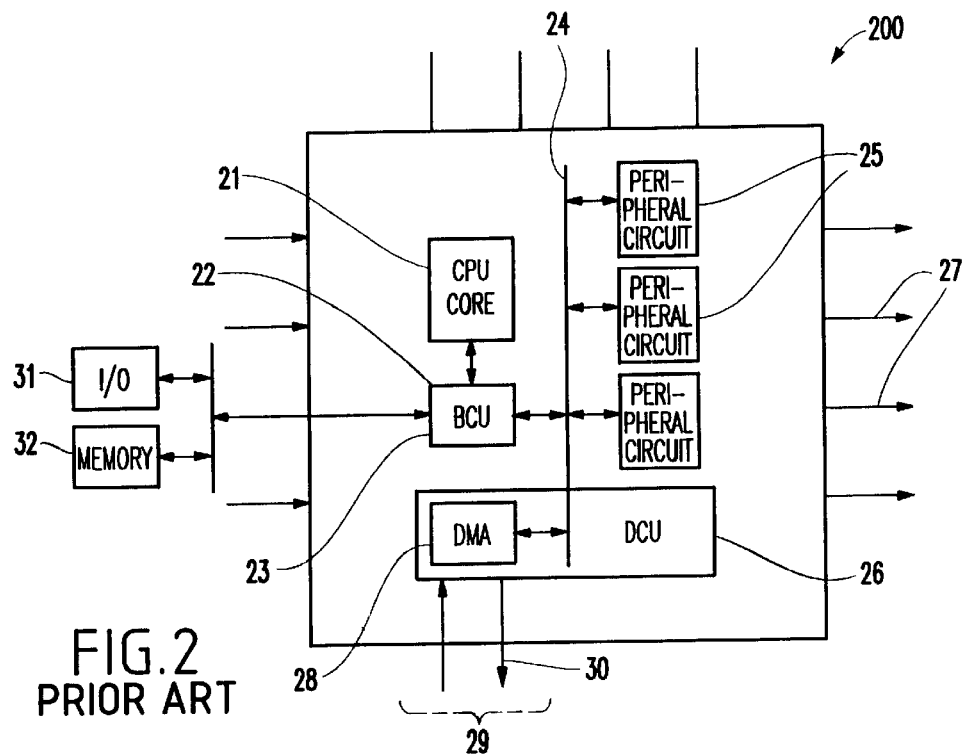
FIG. 2 is a block diagram showing an internal structure of another conventional integrated circuit device.

Those parts shown in FIG. 3 which are identical to those of the conventional integrated circuit device 200 shown in FIG. 2 are identically referred to, and will not be described in detail below.

Various I/O (Input/Output) ports 49 and a memory 50 operating as an information storage medium on a target board 48 (see FIG. 5) are connected to an external bus 47 that comprises the lead terminals 46 which are connected directly to the BCU 43. The memory 50 stores instruction codes and processed data which are to be read by the CPU core 41 of the integrated circuit device 300.

A plurality of lead terminals 53 which make up a debugging I/F 52 of JTAG inspection information I/F are connected to a DCU 51 serving as an inspection control circuit. The DCU 51 has a register unit 54. The DCU 51 is connected to the BCU 43 by a dedicated internal bus 55. The BCU 43 selectively connects the memory 50 and the DCU 51 to the CPU core 41.

Figure 4:
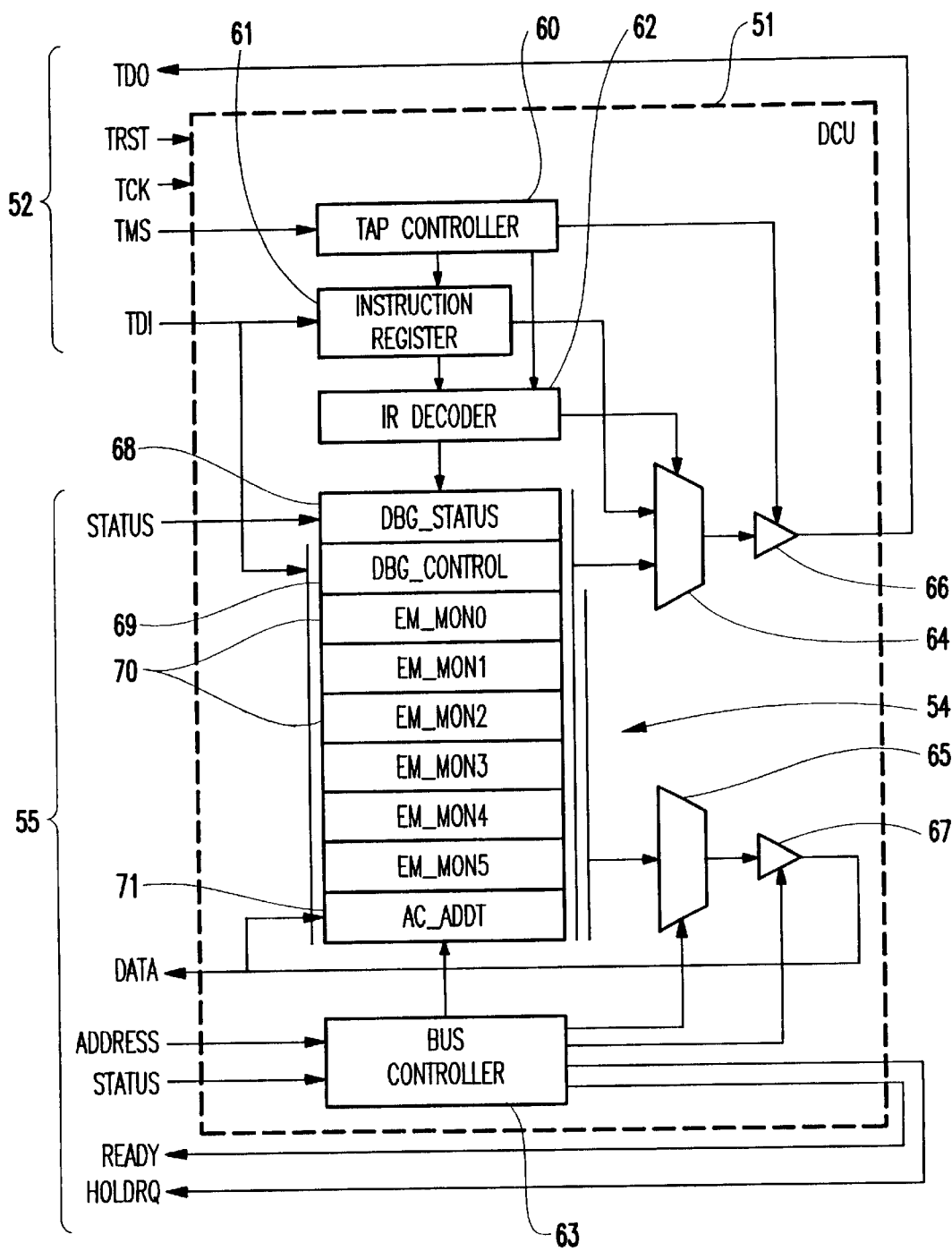
FIG. 4 is a block diagram showing an internal structure of a DCU as an inspection control circuit.

As shown in FIG. 4, the DCU 51 comprises, in addition to the register unit 54, a TAP (Test Access Port) controller 60, an instruction register 61, an IR (Instruction Register) decoder 62, a bus controller 63, a pair of selectors 64, 65, and a pair of buffers 66, 67. The register unit 54 comprises a plurality of registers 68–71.

The instruction register 61 and the register unit 54 are connected respectively to a pair of input terminals of the selector 64, whose output terminal is connected to the buffer 66. The buffer 66 has a control terminal to which the TAP controller 60 is connected.

The registers 68–71 of the register unit 54 includes a single debug status register 68 for storing debug status data, a single debug control register 69 for storing debug control data, a plurality of monitor registers 70 for storing instruction codes for the CPU core 41, and a single access data register 71 for storing data to be processed by the CPU core 41.

The monitor registers 70 and the access data register 71 are connected to respective input terminals of the selector 65, whose control terminal is connected to the bus controller 63. The selector 65 has an output terminal connected to the buffer 67, whose control terminal is connected to the bus controller 63.

The debugging I/F 52 of JTAG is connected to the TAP controller 60, the instruction register 61, the register unit 54, and the IR decoder 62, and carries input data and output data.

The internal bus 55 which interconnects the DCU 51 and the BCU 43 is connected to the monitor registers 70 and the access data register 71 of the register unit 54, and the bus controller 63. The internal bus 55 carries input/output data "Data", output data "Ready", "Holdrq", etc., and input data "Address", "Status", etc.

Debug status data stored by the debug status register 68, debug control data stored by the debug control register 69, instruction codes for and data to be processed by the CPU core 41, which are stored by the monitor registers 70, and data to be processed by the CPU core 41, which is stored by the access data register 7, will be described below.

1. Debug status data DBG_STATUS Debugging I/F 52: RO, CPU core 41: xDBM Debug Mode Status This indicates an execution mode for the CPU core 41. A normal mode thereof is an ordinary mode for executing a user program. A debug mode thereof is an inspection mode for executing a highest-priority interrupt/exception process. In order to shift from the normal mode to the debug mode, these methods are available:

1. A break interrupt request BRI bit is set to "1" to generate a debut interrupt request.
2. A breakpoint instruction BRKPNT is executed.

In order to return from the debug mode to the normal mode, these methods are available:

1. A return instruction BRPRET from the debug mode is executed.
2. An Force Reset Request RST bit is set to "1" to reset the CPU core 41.
   1: Debug mode
   0: Normal mode
   EED Monitor Operation End Status This indicates that a monitoring process of the CPU core 41 is ended and the CPU core 41 is in a pending state. In order to place the CPU core 41 in a pending state when the monitoring process thereof is ended, these methods are available:

1. When the monitoring process is ended, a bus hold request is generated to place the CPU core 41 in a bus hold state. By setting an monitor operation start request EST bit to "1", the bus hold request is canceled, resuming the monitoring process of the CPU core 41.
2. When the monitoring process is ended, a ready signal is not returned in a next instruction fetch cycle, thereby putting bus cycles in a BUSY state. By setting the EST bit to "1", a ready signal is returned to finish a fetch cycle, resuming the monitoring process of the CPU core 41.
3. When the monitoring process is ended, a next instruction is set to a loop instruction (a branch instruction for the CPU core 41), causing the CPU core 41 to execute fetch and branch instructions repeatedly. By setting the EST bit to "1", an instruction to be fetched by the CPU core 41 is changed from an endless loop instruction to an instruction set to EM_MONn, resuming the monitoring process of the CPU core 41.
   1: The monitoring process is ended.
   0: The monitoring process is not ended.
   TRS Reset Input Status This indicates the status of a reset input signal entered from an external source. The reset input signal entered from the external source is masked when an MTR bit is set to "1". The reset input signal entered from the external source is always masked in the debug mode irrespective of the MTR Reset Mask Request bit.
   1: A reset input signal entered from an external source is active.
   2: A reset input signal entered from an external source is inactive.

2. Debug control data DBG_CONTROL Debug I/F52: R/W, CPU core 41: xEST Monitor Operation Start Request The monitoring process which has been ended by the CPU core 41 when an EED bit is "1" can be resumed when the EST bit is set to "1". While the monitoring process is being ended, when a new instruction or data is established in the registers 70, 71 of EM_MONn/AC_ADDT and then the EST bit is set to "1", the CPU core 41 executes a new monitoring process.

1: Start of a monitoring process is requested.
2: Nothing is done (default).
BRI Break Interrupt Request This is used in order to shift the CPU core 41 from the normal mode to the debug mode. A debug interrupt is a highest-priority interrupt at the CPU core 41.

1: A debug interrupt is requested.
    0: A debug interrupt is canceled (default).
REE Reset Handler Emulation Enable This is used for the DCU to substitute for a reset handler area. Since a substitute area is accessed after the CPU core 41 is reset by setting REE to "1", the CPU core 41 can be shifted into the debug mode immediately after the CPU core 41 is started by:

1. executing a breakpoint instruction BRKPNT in the substitute area, or
2. executing a loop instruction in the substitute area and setting the BRI bit to "1" to generate a debug interrupt request. Since a RAM, rather than a ROM, is often used in a development stage, this control data is indispensable for downloading a development program.

1: A reset handler area is substituted for.
    0: A reset handler area is not substituted for (default).
RST Force Reset Request This is used to reset the CPU core 41 irrespective of the status of a reset input signal entered from an external source. When a debugging tool is connected to the debugging I/F 52, the default value immediately after the power supply is turned on can be changed by changing the terminal processing to a condition different from the condition in which no debugging tool is connected to the debugging I/F 52.

1: The CPU core 41 is forcibly reset (when a debugging tool is connected).
    0. The CPU core 41 is not forcibly reset (when no debugging tool is connected).
MTR Reset Mask Request This is used to mask a reset input signal entered from an external source. When the CPU core 41 enters the debug mode, a reset input signal entered from an external source is always masked irrespective of the MTR bit in order to carry out a monitoring process.

1: A reset input signal entered from an external source is masked.
    0: A reset input signal entered from an external source is not masked (default).

3. Instruction code EM_MONn(n=0–6) Debugging I/F 52: R/W, CPU core 41: RO EM_MONn[31:0] Monitor Instruction Code (/Access Address/Data)

This sets an instruction code for an instruction executed in a monitoring process with the debugging I/F 52, and sets data to be processed, such as an address to be accessed in a monitoring process with the debugging I/F 52.

4. Data to be processed AC_ADDT Debugging I/F 52: R/W, CPU core 41: R/W AC_ADDT[31:0] Access Address/Data This sets data to be processed, such as an address to be accessed in a monitoring process with the debugging I/F 52, and is established from the CPU core 41 when the result of an executed monitoring process is to be received from the CPU core 41.

Figure 5:
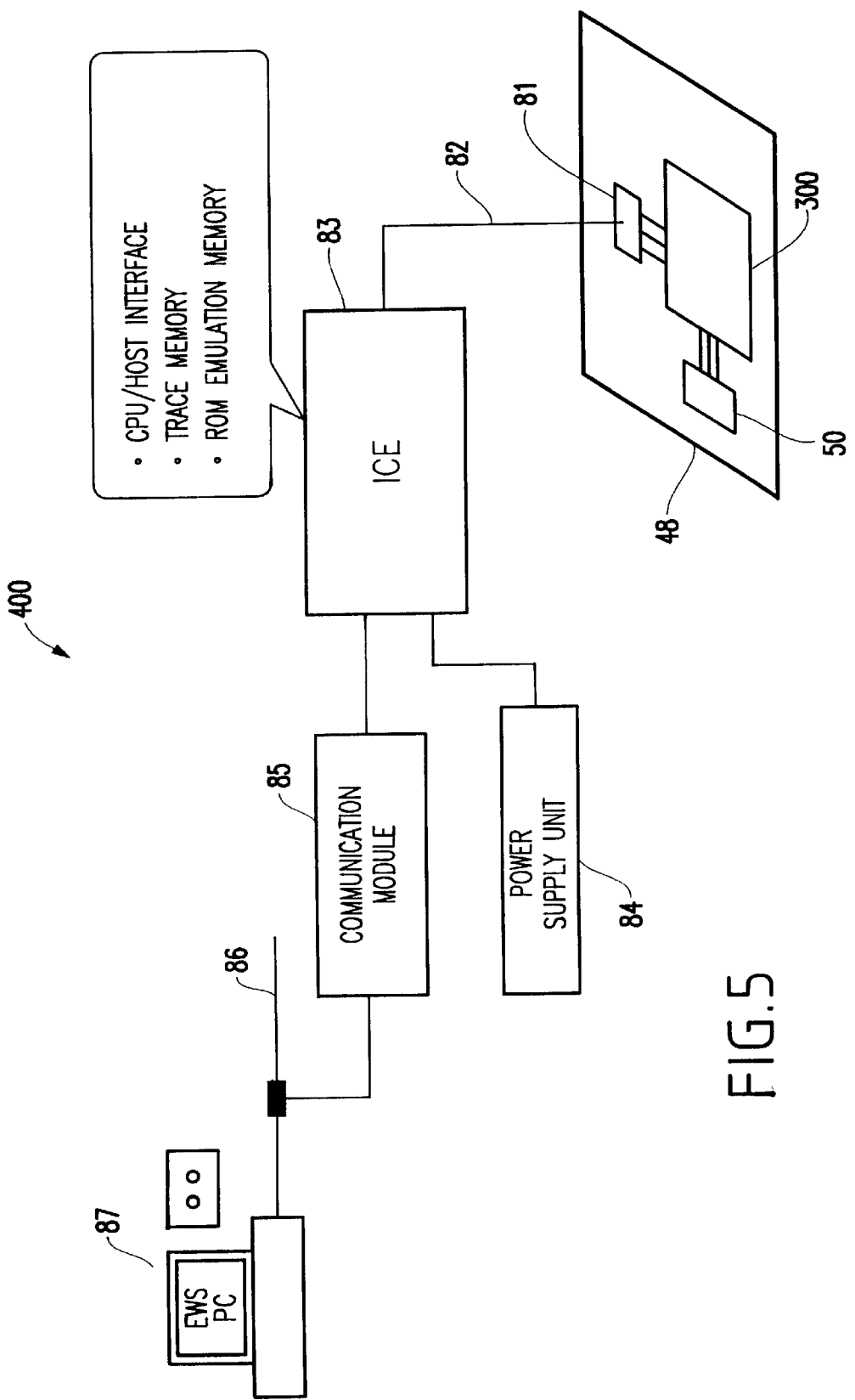
FIG. 5 is a diagram of a circuit inspection device connected to a target board which is a circuit board with the integrated circuit device mounted thereon.

The integrated circuit device 300 according to the present invention is installed on the target board 48 prepared by the user, and the external bus 47 of the integrated circuit device 300 is connected to the I/O ports 49 and the memory 50 which are mounted on the target board 48 by printed interconnections. As shown in FIG. 5, an inspection connector 51 is mounted on the target board 48, and the debugging I/F 52 of the integrated circuit device 300 is connected to the connector 81.

The BCU 43 has a normal mode and a debug mode its operation modes that can be switched from one to the other. In the normal mode, the BCU 43 connects the external bus 47 continuously to the CPU core 41. In the debug mode, the BCU 43 switches the CPU core 41 from the external bus 47 to the DCU 51 when the address of an access destination issued by the CPU core 41 agrees with the address, which has been established beforehand, of the register unit 54 of the DCU 51.

The connector 81 on the target board 48 is used only when the integrated circuit device 300 is inspected. A debugging system 40 as a circuit inspection device can detachably be connected to the connector 81. The debugging system 400 has an ICE 83 that can detachably be connected to the connector 81 by a connector 82. To the ICE 83, there are connected a power supply unit 84 and a communication module 85 which is connected to a communication line 86 connected to a host computer 87.

Each of the ICE 83 and the host computer 87 comprises a computer system which has various logic functions as various corresponding means that can be performed to achieve various data processing tasks according to an appropriate program which has been loaded beforehand. The debugging system 400 has a mode switching means, an instruction storing means, a data storing means, and a return storing means, provided as logic functions.

The mode switching means changes the operation mode of the BCU 43 from the normal mode to the debug mode when an operation mode switching flag for the BCU 43 is issued by the ICE 83 and supplied through the connectors 82, 81 to the debugging I/F 52 of the integrated circuit device 300.

When an instruction code for enabling the CPU core 41 to execute certain data processing is issued from the ICE 83, the instruction storing means supplies the instruction code from the connectors 82, 81 to the debugging I/F 52, and stores the instruction code in the monitor registers 70.

When data required by data processing executed by the CPU core 41 is issued by the ICE 83, the data storing means supplies the data from the connectors 82, 81 to the debugging I/F 52, and stores the data in the registers 70, 71.

When an instruction code for returning an access destination to be accessed by the CPU core 41 is issued by the ICE 83, the return storing means supplies the instruction code from the connectors 82, 81 to the debugging I/F 52, and stores the instruction code in the monitor registers 70.

The program which realizes the above various means as the various functions is stored beforehand as software in an information storage medium in the debugging system 400. When a monitoring process is to be executed, the program is copied into the DCU 51, and then read by the CPU core 41 and the BCU 43.

When a debug interrupt occurs, the CPU core 41 branches to a debug handler area whose addresses are "0xffffffef-0xffffffef" of a cache area. When the debug handler area is accessed, the BCU 43 switches the CPU core 41 from the external bus 47 to the DCU 51 in the debug mode.

After the integrated circuit device 300 is reset, the CPU core 41 branches to a reset handler area whose addresses are "0xfffffff0-0xffffffff" of the cache area. When the reset handler area is accessed only while "REE" of the debug control data "DBG_CONTROL" is being set to "1" in the debug mode, the BCU 43 switches the CPU core 41 from the external bus 47 to the DCU 51.

Since a monitoring process is carried out by successively replacing an instruction at the same address, when the monitoring process is to be carried out in the cache area, it is necessary to clear the cache area before and after replacing an instruction, or to execute the monitoring process in an uncache area.

In the integrated circuit device 300, the CPU core 41 branches from the debug handler area to the uncache area according to the latter method, and then executes the monitoring process at addresses 0x61000000-0x600001f. When this area is accessed, the BCU 43 switches the CPU core 41 from the external bus 47 to the DCU 51 in the debug mode.

After the monitoring process, the execution by the CPU core 41 may be brought into a pending state using a bus hold request "Holdrq". The bus hold request "Holdrq" generated from the DCU 51 for the BCU 43 by reading (1d.w 0xc[rXX],r0) a certain area "0x61000011 c" during the debug mode.

A specific example of a program for performing the above various functions when the debugging system 40 monitors the integrated circuit device 300 will be described below.

(1) Initial codes:

Prior to a transition to a first debug mode, instruction codes for a monitoring start process and a monitoring end process are established in advance in the registers 70, 71 of EM_MONn, AC_DDT. Monitoring process area (uncache area)→monitoring end process

| | | | |
|---|---|---|---|
| — | 0x61000000 | EM_MON0 | ld.w 0 x lc[rXX],r0 |
| — | 0x61000004 | EM_MON1 | br +2 |
| — | 0x61000006 | EM_MON1 | ld.w 0 x 18[rXX],rXX |
| — | 0x61000008 | EM_MON2 | (continued from ld.w instruction code) |
| — | 0x6100000A | EM_MON2 | brkret |

Debug handler area (cache area)/monitoring process area (uncache area) →monitoring start process

| | | | |
|---|---|---|---|
| 0xFFFFFFE0 | 0x6100000C | EM_MON3 | st.w rXX,0xffffffec[r0] |
| 0xFFFFFFE4 | 0x61000010 | EM_MON4 | movhi 0x6100,r0,rXX |
| 0xFFFFFFE8 | 0x61000014 | EM_MON5 | jmp[rXX] |
| 0xFFFFFFEA | 0x61000016 | EM_MON5 | nop |
| 0xFFFFFFEC | 0x61000018 | AC_ADDT | (nop) |
| 0xFFFFFFEE | 0x6100001A | AC_ADDT | (nop) |
| — | 0x6100001C | fixed instruction code | nop |
| — | 0x6100001E | fixed instruction code | nop |

Reset handler area (cache area) (when the REE bit of the DBG_CONTROL register is "1")

| | | | |
|---|---|---|---|
| 0xFFFFFFF0 | — | fixed instruction code | br +0 |
| 0xFFFFFFF2 | — | fixed instruction code | nop |
| 0xFFFFFFF4 | — | fixed instruction code | br +0 |
| 0xFFFFFFF6 | — | fixed instruction code | nop |
| 0xFFFFFFF8 | — | fixed instruction code | br +0 |
| 0xFFFFFFFA | — | fixed instruction code | nop |
| 0xFFFFFFFC | — | fixed instruction code | br +0 |
| 0xFFFFFFFE | — | fixed instruction code | nop |

(2) Monitoring start process:

Since a debug handler is in a cache area, it branches to an uncache area. At this time, the value of a general register rXX used in a monitoring process is saved to the access data register 71 of AC_DDT.

| | | |
|---|---|---|
| 0xFFFFFFE0 | EM_MON3 st.w rXX,0xFFFfffec[r0] | The value of rXX is saved to AC_DDT |
| 0xFFFFFFE4 | EM_MON4 movhi 0x6100,r0,rXX | 0x61000000 is set to rXX |
| 0xFFFFFFE8 | EM_MON5 jmp[rXX} | Branching to 0x61000000 |
| 0xFFFFFFEA | EM_MON5 nop | Nothing done |
| 0xFFFFFFEC | AC_ADDT (nop) | The value of rXX is saved |
| 0xFFFFFFEE | AC_ADDT (nop) | The value of rXX is saved |
| 0x61000000 | EM_MON0 ld.w 0 x lc[rXX],rp | Pending after loading is executed |
| 0x61000004 | EM_MON1 br + 2 | Branching for re-fetching |
| 0x61000006 | EM_MON1 (ld.w 0 x 18[rXX],rXX) | |

(By generating a bus hold request during a data read access from a certain area due to the execution of an instruction to load→EM_MON0, the CPU core 41 is brought into a bus hold state, holding the execution of instructions in a pending state after the end of a read cycle. In the integrated circuit device 300, the CPU core 41 has a write buffer as an internal register. Since the execution of a write cycle is further delayed even when the CPU core 41 finishes the execution of a store instruction, it is possible to ensure the sequence of data accesses by holding the execution of instructions in a pending state with reading of data from an uncache area, and the exchange of data using the access data register 71 of AC_ADDT is reliably finished. After the bus holding is canceled, because the execution of instructions is resumed from a branch instruction of EM_MON1, pipeline is flushed by branching, and a new instruction code of EM_MON1 is re-fetched and executed.)

(2) Monitoring end process:

The value of the general register rXX is returned to the original value, and a return instruction from the debug mode is executed. For a next transition to the debug mode, initial codes are established in the monitor registers 70 of EM-MONn.

| | | |
|---|---|---|
| 0x61000004 | EM_MON1 br + 2 | Branching for re-fetching |
| 0x61000006 | EM_MON1 ld.w 0 x 18[rXX],rXX | The value of rXX is returned to the original value |
| 0x61000008 | EM_MON2 | Continued from ld.w instruction code |
| 0x6100000A | EM_MON2 brkret | Returned from the debug mode |
| 0x6100000C | EM_MON3 st.w rXX,0xFFFfffec[r0] | (Code prior to monitoring start process) |
| 0x61000010 | EM_MON4 movhi 0x6100,r0,rXX | (Code prior to monitoring start process) |
| 0x61000014 | EM_MON5 jmp [rXX] | (Code prior to monitoring start process) |
| 0x61000016 | EM_MON5 nop | (Code prior to monitoring start process) |
| 0x61000018 | AC_DDT (saved value of rXX) | Saved value is established |

(4) Example of reading the value of a general register (Example of reading the value of a general register rYY:

| | | | |
|---|---|---|---|
| 0x61000004 | EM_MON1 | br + 2 | Branching for re-fetching |
| 0x61000006 | EM_MON1 | nop | Nothing done |
| 0x61000008 | EM_MON2 | st.w rYY,0 x 18[rXX] | rYY value is stored in AC_DDT |
| 0x6100000C | EM_MON3 | jmp [rYY] | Return to 0x61000000 |
| 0x6100000E | EM_MON3 | nop | Nothing done |
| 0x61000018 | AC_DDT | — | rYY value is written |
| 0x61000000 | EM_MON0 | ld.w 0 x 1c[rXX],r0 | Pending after loading is executed |
| 0x61000004 | EM_MON1 | br + 2 | Branching for re-fetching |
| 0x61000006 | EM_MON1 | (nop) | |

(→the monitoring process is ended. AC_DDT is read to obtain the value of rYY.)

(5) For establishing a designated value in a general register (Example of a designated value in a general register rYY):

| | | | |
|---|---|---|---|
| 0x61000004 | EM_MON1 | br + 2 | Branching for re-fetching |
| 0x61000006 | EM_MON1 | nop | Nothing done |
| 0x61000008 | EM_MON2 | ld.w 0 x 18[rXX],rYY | The designated value is established in rYY |
| 0x6100000C | EM_MON3 | jmp [rXX]0x | Return to 61000000 |
| 0x6100000E | EM_MON3 | nop | Nothing done |
| 0x61000018 | AC_DDT | (The value to be established in rYY) | The value to be established in rYY |
| 0x61000000 | EM_MON0 | ld.w 0 x 1c[rXX],r0 | Pending after loading is executed |
| 0x61000004 | EM_MON1 | br + 2 | Branching for re-fetching |
| 0x61000006 | EM_MON1 | (nop) | |

(→the monitoring process is ended.)

(6) For reading the value of a system register (Example of reading the value of a system register sXX):

| | | | |
|---|---|---|---|
| 0x61000004 | EM_MON1 | br + 2 | Branching for re-fetching |
| 0x61000006 | EM_MON1 | stsr sXX,RYY | sXX value is copied to rYY |
| 0x61000008 | EM_MON2 | st.w rYY,0 x 18[rXX] | rYY value is stored in AC_DDT |
| 0x6100000C | EM_MON3 | jmp [rXX] | Return to 0x61000000 |
| 0x6100000E | EM_MON3 | nop | Nothing done |
| 0x61000018 | AC_ADDT | — | sXX value is written |
| 0x61000000 | EM_MON0 | ld.w 0 x 1c[rXX],r0 | Pending after loading is executed |
| 0x61000004 | EM_MON1 | br + 2 | Branching for re-fetching |
| 0x61000006 | EM_MON1 | (stsrSySx,rYY) | |

(→the monitoring process is ended. AC_DDT is read to obtain the value of sXX.)

(7) For establishing a designated value in a general register (Example of a designated value in a general register sxX):

| | | | |
|---|---|---|---|
| 0x61000004 | EM_MON1 | br + 2 | Branching for re-fetching |
| 0x61000006 | EM_MON1 | nop | Nothing done |
| 0x61000008 | EM_MON2 | ld.w 0 x 18[rXX],rYY | The designated value is established in rYY |
| 0x6100000C | EM_MON3 | ldsr rYY,sXX | rYY value is copied to sXX |
| 0x6100000E | EM_MON3 | jmp [rXX] | Return to 0x61000000 |
| 0x61000018 | AC_DDT | (The value to be established in sXX) | The value to be established in sXX |
| 0x61000000 | EM_MON0 | ld.w 0 x 1c[rXX],r0 | Pending after loading is executed |
| 0x61000004 | EM_MON1 | br + 2 | Branching for re-fetching |
| 0x61000006" | (nop) | | |

(→the monitoring process is ended.)

(8) Reading data from a designated address space (Example of reading words from a memory):

| | | | |
|---|---|---|---|
| 0x61000004 | EM_MON1 | br + 2 | Branching for re-fetching |
| 0x61000006 | EM_MON1 | nop | Nothing done |
| 0x61000008 | EM_MON2 | ld.w 0 x 18[rXX],rYY | A load address is established in rYY |
| 0x6100000C | EM_MON3 | ld.w 0 x 00[rYY],rZZ | Loading from a designated address |
| 0x61000010 | EM_MON4 | st.w rZZ 0 x 18[rXX] | rZZ value is written in AC_DDT |
| 0x61000014 | EM_MON5 | jmp [rXX] | Return to 0x61000000 |
| 0x61000016 | EM_MON5 | nop | Nothing done |
| 0x61000018 | AC_ADDT | (load address) | A load address is established |
| | | (load data) | Load data is written |
| 0x61000000 | EM_MON0 | ld.w 0 x 1c[rXX],r0 | Pending after loading is executed |
| 0x61000004 | EM_MON1 | br + 2 | Branching for re-fetching |
| 0x61000006 | EM_MON1 | (nop) | |

(→the monitoring process is ended. AC_ADDT is read to obtain the value of load data.)

(9) Writing data in a designated address space (Example of writing words from a memory): In this case, a monitoring process of the following two steps is carried out.

1. An address at which data is to be written is established.
2. Data to be written is established, and designated data is written in the designated address.

[1st step]

| | | | |
|---|---|---|---|
| 0x61000004 | EM_MON1 | br + 2 | Branching for re-fetching |
| 0x61000006 | EM_MON1 | nop | Nothing done |
| 0x61000008 | EM_MON2 | 1d.w 0 × 18[rXX],rYY | A load address is established in rYY |
| 0x6100000C | EM_MON3 | jmp [rXX] | Return to 0x61000000 |
| 0x6100000E | EM_MON3 | nop | Nothing done |
| — | | | |
| 0x61000018 | AC_ADDT | (store address) | A store address is established |
| — | | | |
| 0x61000000 | EM_MON0 | 1d.w 0 × 1c[rXX],r0 | Pending after loading is executed |
| 0x61000004 | EM_MON1 | br + 2 | Branching for re-fetching |
| 0x61000006 | EM_MON1 | nop | Nothing done |

(→the monitoring process is ended. A second instruction code is established in EN_MONn, and store data is established in AC_ADDT, after which the monitoring process is started.)

[2nd step]

| | | | |
|---|---|---|---|
| 0x61000004 | EM_MON1 | br + 2 | Branching for re-fetching |
| 0x61000006 | EM_MON1 | nop | Nothing done |
| 0x61000008 | EM_MON2 | 1d.w 0 × 18[rXX],rZZ | A load address is established in rZZ |
| 0x6100000C | EM_MON3 | st.w rZZ, 0 × 00[rYY] | Data is stored at a designated address |
| 0x61000010 | EM_MON5 | jmp [rXX] | Return to 0x61000000 |
| 0x61000012 | EM_MON5 | nop | Nothing done |
| — | | | |
| 0x61000018 | AC_ADDT | (store data) | store data is written |
| — | | | |
| 0x61000000 | EM_MON0 | 1d.w 0 × 1c[rXX],r0 | Pending after loading is executed |
| 0x61000004 | EM_MON1 | br + 2 | Branching for re-fetching |
| 0x61000006 | EM_MON1 | (nop) | |

(→the monitoring process is ended.)

In use, the integrated circuit device 300 according to the present invention is installed on the target board 48 prepared by the user. A program composed of various instruction codes and data to be processed is loaded as software in the memory 50 on the target board 48. The integrated circuit device 300 reads instruction codes and data to be processed from the memory 50 on the target board 48.

At this time, the operation mode of the integrated circuit device 300 is the normal mode by default. Since the BCU 43 connects the memory 50 continuously to the CPU core 41, the CPU core 41 executes various data processing tasks based on instruction codes and data read from the memory 50.

The program stored in the memory 50 for controlling the integrated circuit device 300 to process data needs to be debugged when the integrated circuit device 300 is in its development stage. For debugging the program, as shown in FIG. 5, the debugging system 400 is connected to the integrated circuit device 300 installed on the target board 48.

Specifically, since the debugging I/F 52 of the integrated circuit device 300 is connected to the connector 81 on the target board 48, the connector 82 of the debugging system 400 is joined to the connector 81. As shown FIG. 5, the integrated circuit device 300 carries out a data processing operation according to the program stored in the memory 50 on the target board 48, and while the integrated circuit device 300 is carrying out the data processing operation, the debugging system 400 accesses the DCU 51 via the debugging I/F 52.

The DCU 52 effects an interrupt process on the BCU 43 to change the operation mode of the integrated circuit device 300 from the normal mode to the debug mode which is an inspection mode. The integrated circuit device 300 will subsequently process data in the debug mode. Specifically, the debugging system 400 stores a plurality of instruction codes and data to be processed into the registers 70, 71 of the DCU 51, and stores an instruction code for returning an access destination for the CPU core 41 to their initial position into the final monitor register 70.

Inasmuch as the CPU core 41 is connected to the memory 50 on the target board 48 by the BCU 43, the CPU core 41 executes the data processing operation according to the program stored in the memory 50. In the debug mode, the BCU 43 compares addresses issued by the CPU core 41 in the data processing operation with a given address which has been established beforehand for debugging. When an address from the CPU core 41 agrees with the given address, the BCU 43 changes a destination to be connected to the CPU core 41 from the memory 50 to the DCU 51.

The CPU core 41 then reads instruction cores and data to be processed from the registers 70, 71 of the DCU 51, so that the integrated circuit device 300 carries out a desired data processing operation for debugging. As the CPU core 41 successively reads instruction codes and data to be processed from the registers 70, 71 and carries out the data processing operation, the CPU core 41 returns an access destination to the initial position of the monitor registers 70 depending on the instruction code in the final monitor register 70.

For example, the bus controller 63 of the DCU 51 causes the CPU core 41 to wait via the BCU 43. Therefore, when the debugging system 400 updates instruction codes and data to be processed which are stored in the registers 70, 71 of the DCU 51, the debugging system 400 can cause the CPU core 41 to effect a next data processing operation for debugging. At this time, the debugging system 400 may temporarily store and collect data processed by the CPU core 41, which executes the data processing operation for debugging, in the registers 70, 71.

As described above, the debugging system 400 causes the CPU core 41 to effect a data processing operation for debugging while updating the debugging program in the registers 70, 71. When this data processing operation is completed, the debugging system 400 returns the operation mode of the integrated circuit device 300 from the debug mode to the normal mode.

In the integrated circuit device 300 according to the present invention, as described above, the DCU 51 is connected to the BCU 43, which switches a destination to be connected to the CPU core 41 between the memory 50 on the target board 48 and the registers 70, 71 of the DCU 51 at predetermined times.

If the debugging system 400 stores desired instruction codes and data to be processed in the registers 70, 71, then the debugging system 400 is capable of causing the CPU core 41 to execute a desired data processing operation for debugging. Consequently, it is possible to inspect the integrated circuit device 300 while it is being mounted on the target board 48 desired by the user.

Since the registers 70, 71 can freely store various instruction codes and data to be processed for enabling the CPU core 41 to execute various data processing tasks, the process of inspecting the integrated circuit device 300 is not limited to the boundary scan test.

In the debug mode, the CPU core 41 processes data in the same manner as in the normal mode. Accordingly, the debugging system 400 can inspect various parts of the integrated circuit device 300. Unlike the conventional DMA process described above, the internal register of the CPU core 41 can also be inspected without the need for a substantial modification of the CPU core 41.

With the integrated circuit device 300 and the debugging system 400, when instruction codes and data to be processed are stored in the registers 70, 71 and the CPU core 41 executes a data processing operation for debugging based on the stored instruction codes and data to be processed, an access destination for the CPU core 41 is returned to the initial position of the monitor registers 70 depending on the instruction code in the final monitor register 70. Therefore,. the number of registers 70, 71, which are devices dedicated for debugging and not required in the normal mode, may be small, and hence the circuit scale of the integrated circuit device 300 may be of a minimum required.

In the above embodiment, the debugging system 400 stores an instruction code for returning an access destination for the CPU core 41 to the initial position in the final monitor register 70. However, this instruction code may fixedly be stored in the final monitor register 70, rather than being stored by the debugging system 400.

While a preferred embodiment of the present invention has been described using specific terms, such description is for illustrative purposes only, and it is to be understood that changes and variations may be made without departing from the spirit or scope of the following claims.

What is claimed is:

1. An integrated circuit device comprising:
   a central processing unit for reading instruction codes and data to be processed and executing data processing tasks based on said instruction codes and data;
   an external bus for connecting said central processing unit to an external information storage medium which stores instruction codes and data to be processed;
   an inspection information interface for detachably connecting to an external circuit inspection apparatus;
   an inspection control circuit connected to said inspection information interface and having a plurality of registers for temporarily storing instruction codes and data to be processed which are supplied from said external circuit inspection apparatus;
   a dedicated internal bus which is solely dedicated to bi-directionally connecting said central processing unit to said inspection control circuit; and
   a bus control unit for selectively connecting one of said external bus and said dedicated internal bus to said central processing unit,
   wherein said bus control unit has an operation mode switchable between a normal mode and an inspection mode and connects said external bus continuously to said central processing unit in said normal mode and switches an access destination address of said central processing unit from said external bus to said inspection control circuit in said inspection mode when said access destination address of said central processing unit agrees with a predetermined address of a register of said inspection control circuit.

2. An integrated circuit device according to claim 1 wherein said plurality of registers of said inspection control circuit comprises:
   an instruction code register for temporarily storing an instruction code for instructing said central processing unit to execute a predetermined data processing operation;
   a data register for temporarily storing data to be processed by said central processing unit based on said instruction code stored by said instruction code register; and
   a temporary return instruction code register for temporarily storing an instruction code to return an access destination address of said central processing unit to said instruction code register.

3. An integrated circuit device according to claim 1 wherein said plurality of registers of said inspection control circuit comprises:
   an instruction code register for temporarily storing an instruction code for instructing said central processing unit to execute a predetermined data processing operation;
   a data register for temporarily storing data to be processed by said central processing unit based on said instruction code stored by said instruction code register; and
   a permanent return instruction code register for permanently storing a predetermined instruction code to return an access destination address of said central processing unit to said instruction code register.

4. A method of inspecting an integrated circuit device having a central processing unit, a dedicated internal bus and a bus control unit, said method comprising:
   providing said integrated circuit device with an inspection control circuit having an instruction code register, a data register, and a temporary return instruction code register;
   storing an instruction code for a predetermined data processing operation in said instruction code register;
   storing data to be processed by said central processing unit in said data register;
   storing said instruction code to return an access destination address in said temporary return instruction code register;
   updating said instruction code stored in said instruction code register and said data stored in said data register when said central processing unit executes said predetermined data processing operation based on said instruction code stored in said instruction code register and said data stored in said data register; and
   returning said access destination address of said central processing unit to said instruction code register based on said intruction code stored in said temporary return instruction code register,
   wherein said dedicated internal bus is solely dedicated to bi-directionally connecting said central processing unit to said inspection control circuit, and
   wherein said bus control unit connects said central processing unit to an external bus during a normal mode and connects said central processing unit to said inspection control circuit during an inspection mode.

5. A method of inspecting an integrated circuit device having a central processing unit, a dedicated external bus and a bus control unit, said method comprising:
   providing said integrated circuit device with an inspection control circuit having an instruction code register, a data register, and a permanent return instruction code register;
   storing an instruction code for a predetermined data processing operation in said instruction code register;
   storing data to be processed by said central processing unit in said data register;
   updating said instruction code stored in said instruction code register and said data stored in said data register when said central processing unit executes said predetermined data processing operation based on said instruction code stored in said instruction code register and said data stored in said data register; and
   returning an access destination address of said central processing unit to said instruction code register based on said instruction code stored in said permanent return instruction code register,
   wherein said dedicated internal bus is solely dedicated to bi-directionally connecting said central processing unit to said inspection control circuit; and
   wherein said bus control unit connects said central processing unit to an external bus during a normal mode and connects said central processing unit to said inspection control circuit during an inspection mode.

6. An apparatus for an inspecting an integrated circuit device according to claim 2 comprising:
   a connector detachably connected to said inspection information interface;
   instruction code storing means for storing an instruction code for instructing said central processing unit to execute a predetermined data processing operation from said connector through said inspection information interface into said instruction code register;
   data storing means for storing data to be processed from said connector through said inspection information interface into said data register; and
   return instruction code storing means for storing said instruction code to return an access destination address from said connector through said inspection information interface into said temporary return instruction code register.

7. An apparatus for an inspecting an integrated circuit device according to claim 3 comprising:
   a connector detachably connected to said inspection information interface;
   instruction code storing means for storing an instruction code for instructing said central processing unit to execute a predetermined data processing operation from said connector through said inspection information interface into said instruction code register; and
   data storing means for storing data to be processed from said connector through said inspection information interface into said data register.

8. The integrated circuit device according to claim 1, wherein said integrated circuit device is inspectable while mounted on a circuit board.

9. The intergrated circuit device of claim 1, wherein said integrated circuit device is inspectable while bus cycles of said central processing unit continuously operate.

10. The integrated circuit device of claim 1, wherein said inspection control circuit accesses an internal register of said central processing unit.

11. The method of claim 4, wherein said integrated circuit device is inspected while mounted on a circuit board.

12. The method of claim 4, wherein said integrated circuit device is inspected while bus cycles of said central processing unit continuously operate.

13. The method of claim 4, wherein said inspection control circuit accesses an internal register of said central processin unit.

14. The method of claim 4, wherein said central processing unit performs a desired data processing operation while said integrated circuit device is in an inspection mode.

15. The apparatus according to claim 6, wherein said integrated circuit device carries out said data processing operation according to a program stored in an external memory and
   wherein said apparatus accesses said inspection control circuit while said integrated circuit device is carrying out said data processing operation.

16. The apparatus according to claim 6, wherein said inspection control circuit executes an interrupt process on a bus control unit to change an operation mode of said integrated circuit device from normal mode to inspection mode and
   wherein said integrated circuit device processes data while in said inspection mode.

17. The apparatus according to claim 6, wherein said apparatus causes said central processing unit to execute said data processing for inspecting while said apparatus updates a program stored in registers of said inspection control circuit.

18. An integrated circuit device comprising:
   a central processing unit for executing data processing tasks based on instruction codes and data;
   a debug control unit comprising a plurality of registers for storing instruction codes and data for processing by said central processing unit;
   an external bus for connecting said central processing unit to external logic;
   a dedicated internal bus which is solely dedicated to bi-directionally connecting said central processing unit to said debug control unit;
   a bus control unit for connecting said external bus to said central processing unit in a normal mode, and connecting said dedicated internal bus to said central processing unit in an inspection mode; and
   a debugging interface for detachably connecting said debug control unit to an external circuit inspection apparatus.

19. The integrated circuit device of claim 18, wherein said debug control unit comprises:
   a test access port controller;
   an instruction register for storing instruction codes;
   an instruction register decoder;
   a bus controller; and
   a regsiter unit comprising a plurality of registers.

20. The integrated circuit device of claim 19, wherein said dedicated internal bus is connected to said register unit and said bus controller.

21. The integrated circuit device of claim 19, wherein said plurality of registers comprises a debug status register for storing debug status data comprising debug mode status, monitor operation end status, and reset input status.

22. The integrated circuit device of claim 21, wherein said debug mode status indicates an execution mode for said central processing unit, and wherein said execution mode comprises one of a normal mode for executing a user program, and a debug mode for executing a highest-priority interrupt/exception process.

23. The integrated circuit device of claim 21, wherein said monitor operation end status indicates that a monitoring process of said central processing unit is ended and said central processing unit is in a pending state.

24. The integrated circuit device of claim 21, wherein said reset input status indicates a status on a rest input signal from an external source, and wherein said reset input signal is always masked when said integrated circuit device is in a debug mode.

25. The integrated circuit device of claim 19, wherein said plurality of registers comprises a debug control register for storing debug control data comprising monitor operation start request, break interrupt request, reset handler emulation enable, force reset request, and reset mask request.

26. The integrated circuit device of claim 25, wherein said break interrupt request causes said central processing unit to shift from a normal mode to a debug mode.

27. The integrated circuit device of claim 25, wherein said reset handler emulation enable causes said debug control unit to substitute for a reset handler area, wherein a substitute area is accessed after said central processing unit is reset, and wherein said central processing unit shifts into a debug mode immediately after said central processing unit is started.

28. The integrated circuit device of claim 25, wherein said force reset request resets said central processing unit irrespective of a status of a reset input signal entered from an external source, and wherein when an external circuit inspection apparatus is connected to said debugging interface said central processing unit if forcibly reset, and when an external circuit inspection apparatus is not connected to said debugging interface said central processing unit is not forcibly reset.

29. The integrated circuit device of claim 25, wherein said reset mask request is used to mask a reset input signal entered from an external source.

30. The integrated circuit device of claim 19, wherein said plurality of registers comprises a plurality of monitor registers for storing instruction codes to be executed by the central processing unit, and wherein said instruction codes stored in said plurality of monitor registers comprise instructions for processing data, said data comprising an address to be accessed in a debug process.

31. The integrated circuit device of claim 19, wherein said plurality of registers comprises an access data register for storing data to be processed by said central processing unit, said data comprising an address to be accessed in a debug process.

32. The integrated circuit device of claim 1, wherein during an inspection mode, after a monitoring process, said inspection control circuit generates a bus hold request to bring said central processing unit to a pending state.

33. The integrated circuit device of claim 1, wherein after said central processing unit completes a debugging operations, said bus control unit switches from said inspection mode to said normal mode.

34. The integrated circuit device of claim 1, wherein a monitoring program is downloaded from a host computer to said inspection control circuit when a monitoring process is to be executed.

* * * * *